United States Patent [19]

Bruening

[11] Patent Number: 5,316,679
[45] Date of Patent: May 31, 1994

[54] ELUTION OF ANTIMONY FROM SOLID PHASES USING CONCENTRATED SULFURIC ACID CONTAINING DILUTE HYDROCHLORIC ACID

[75] Inventor: Ronald L. Bruening, Salt Lake City, Utah

[73] Assignee: IBC Advanced Technologies, Inc., Provo, Utah

[21] Appl. No.: 61,488

[22] Filed: May 13, 1993

[51] Int. Cl.$^5$ .............................................. B01D 15/04
[52] U.S. Cl. ..................................... 210/634; 210/670
[58] Field of Search ............... 210/634, 511, 670, 688; 423/87

[56] References Cited

U.S. PATENT DOCUMENTS 3,872,210 3/1975 Ukaji et al. ........................... 423/87
4,096,232 6/1978 Vogt ...................................... 423/87

Primary Examiner—Frank Spear
Attorney, Agent, or Firm—Thrope, North & Western

[57] ABSTRACT

A method for the removal of antimony ions from solid phases which have an affinity for antimony ions comprises contacting the antimony containing solid phase with an aqueous eluent solution comprising a mixture of a concentrated solution of sulfuric acid and a dilute solution of hydrochloric acid to quantitatively strip the antimony ions from the solid phase The antimony containing eluent is then removed from contact with the solid phase. The eluent used is a mixture having a sulfuric acid concentration of about 6 to 10M and a hydrochloric acid concentration of about 0.05 to 0.5M. The sulfuric acid can be a "black acid" obtained from copper refining operations. The solid phase having an affinity for antimony ions is generally a member selected from the group consisting of chelating ion exchange resins and macrocyclic or nonmacrocyclic ligands bonded to a hydrophilic solid support. Preferably the process will be carried out by placing the solid phase in a column and passing the eluent through the column to strip the antimony from the solid phase.

16 Claims, No Drawings

ELUTION OF ANTIMONY FROM SOLID PHASES USING CONCENTRATED SULFURIC ACID CONTAINING DILUTE HYDROCHLORIC ACID

BACKGROUND OF THE INVENTION

This invention relates to a method of eluting antimony ions from solid separation phases such as exchange resins and ligands covalently bonded to solid hydrophilic supports.

The removal and maintenance of antimony (Sb) levels at or below particular maximums in copper electrorefining electrolytes is essential in the copper refining industry throughout the world. Solid phases comprising chelating ion exchange resins and ligand containing solid hydrophilic separation phases have been developed which fairly selectively remove antimony from copper electrolye and other antimony containing source solutions by forming a complex or chelate between the antimony ion and the solid phase. Descriptions of the Sb separation operations of these materials using concentrated hydrochloric acid (6M HCl) elutions have been described in reports and articles such as Oda et al., *Tamano Chelating Resin Adsorption Process*, Metallurgical Review of MMIJ, Vol. 3, No. 2, (November 1986); Sasaki et al., *Development of Antimony Removal Process for Copper Electrolyte*, Hydrometallurgy and Electrometallurgy of Copper, Copper 91-Vol. III, page 245 (1991) and, et al., *The Solvent Extraction and Ion Exchange Removal of As, Sb, and Bi from Copper Refining Electrolytes*, Dept. of Metals and Materials Engineering, University of British Columbia, Vancouver B.C. (Jan. 20, 1992).

Ion exchange functionalites used to extract the Sb from source solutions typically are aminophosphonates ($-N-PO_2H$) but other functionalities such as $[-N-(CH_2-COOH)_2]$ could also potentially be used. One class of suitable chelating ion exchange resins consist of a polystyrene support with aminophosphonate or other functional groups being used to bind the Sb ions. Representative of such ion exchange resins are the C-467 resin sold by Rohn & Haas and UR-3300 and MX-2 resins sold by Ubitika of Japan. Suitable chelating ligands attached to hydrophilic supports such as silica gel, titania, alumina, zirconia and the like consist of a ligand covalently attached to the solid support material. The ligand used can be macrocyclic or of linear or branched chain structure containing suitable functionalities to provide electrons for binding of antimony ions. Representative of such chelating ligands attached to solid hydrophilic supports are those manufactured by IBC Technologies, Inc. under the tradename SuperLig, e.g. Superlig 92.

Once the Sb ions are removed from solution and are complexed by the ion exchange resin or a ligand bonded to a solid phase, it becomes necessary to elute the Sb to regenerate the resin or ligand. A difficulty common to all of the solid separation phases presently being used is the requirement that an eluent must be an aqueous solution in which the antimony ions are either soluble or which has greater affinity for antimony than does the solid phase to which it has become attached thereby quantitatively stripping the antimony cations from the ion exchange resin or ligand without adversely affecting the solid phase. The solution currently found most effective is a concentrated hydrochloric acid (HCl) solution (i.e. typically about 6M HCl). The concentrated HCl elution requires that precautions be taken to insure that the HCl does not contact the electrolyte during operation. Also, the elution costs involved are of great importance. These include the costs of the HCl itself and the costs of either recycling the HCl via distillation and/or neutralizing the HCl for disposal. In either event the process is costly and counterproductive. For various reasons, it has long been desired to use a sulfuric acid ($H_2SO_4$) solution for elution in place of the HCl. This should be advantageous in terms of both system chemical compatibility as well as an associated reduction in cost. This cost reduction would be particularly advantageous if the so-called "black acid" form of $H_2SO_4$, which is readily available at copper refineries, could be used. $H_2SO_4$ is not only less expensive than HCl, but economical disposal methods already exist within copper refineries for sulfuric acid disposal, particularly in the "black acid" form. Moreover, the use of $H_2SO_4$ may also allow for the ability to recover antimony as a saleable product.

By "black acid" is meant an industrially produced form of sulfuric acid which also contains impurities such as As, Ni, Se as well as others. Some of the impurities give the acid a brownish to black hue. Hence, the name "black acid".

The major deterrent from using $H_2SO_4$ as an eluent for antimony is the lack of solubility of antimony in sulfuric acid. Hence, the volume of sulfuric acid required for Sb elution is presently so large that it is prohibitive to its use. The solubility of antimony increases slightly as the temperature of $H_2SO_4$ is raised. Furthermore, at too high elevated temperatures the stability of the ion exchange resins and, eventually, ligands bonded to hydrophilic solid supports may be affected.

OBJECTS AND BRIEF SUMMARY OF THE INVENTION

It is an object of the present invention to provide an elution process wherein an eluent, comprising a very dilute hydrochloric acid added to concentrated sulfuric acid, increases the solubility of antimony in the sulfuric acid to the point where the cost and other advantages attributed to either regular or "black acid" $H_2SO_4$ elution of antimony are achieved.

It is also an object of this invention to provide an elution process wherein antimony can be removed from ion exchange resins and ligands bonded to solid supports by means of a sulfuric acid solution modified by the addition of a minor amount of hydrochloric acid.

An additional object of this invention is the regeneration of ion exchange resins and ligands bonded to solid supports which are at least partially saturated with antimony ions by means of a sulfuric acid eluent containing a minor amount of hydrochloric acid.

These and other objects are accomplished by means of first formulating an aqueous eluent solution comprising a major amount of concentrated sulfuric acid which contains minor amounts of hydrochloric acid. The eluent thus prepared is then brought into contact with an antimony containing ion exchange resin or ligand bonded to a solid support for a period of time and at a temperature sufficient to allow the antimony to be released from the resin or ligand into the eluent. The antimony rich eluent is then removed and the regenerated ion exchange resin or ligand is ready for reuse in removing additional antimony from a source solution. The antimony rich eluent can be disposed of by conventional means such as neutralization, other precipitation or appropriate storage. Or, in the alternative, the antimony can be extracted from the eluent and recovered and the eluent recycled.

DETAILED DESCRIPTION OF THE INVENTION

In carrying out the process of the present invention, the concentration of sulfuric acid can be varied from about 6 to 10M with 8M being considered about optimal. Similarly, the range of dilute HCl can vary from about 0.05 to 0.5M with ranges of between about 0.1 and 0.3M being preferred. The eluent thus prepared is then brought into contact with an antimony containing ion exchange resin or ligand bonded to a solid support for a period of time and at a temperature sufficient to allow the antimony to be release from the resin or ligand into the eluent.

For chelating ion exchange resin solid phases, the flowrate will not exceed about 0.1 ml of eluent per gram of resin per minute and can be less. The volume of eluent required to remove the antimony will generally be in the range of about 15 to 50 ml/gram of resin with about 20 mls/gram of resin generally being sufficient. However, for substantially complete Sb elution the amount can be much greater. The system is operative at temperatures of anywhere from ambient to as high as the stability of the resin support will allow which typically will not exceed about 80° C.

For ligands bound to hydrophilic solid supports the flowrate will be not exceed about one ml of eluent per gram of resin per minute and can be less. The volume of eluent required to remove the antimony will be about 5 to 20 mls/gram of ligand/solid support with about 10 mls/gram of ligand/solid support being preferred. The system is operative at temperatures of anywhere from ambient to about 100° to 110° C.

The antimony rich eluent is then withdrawn from the solid phase and the regenerated ion exchange resin or ligand is ready for reuse in removing additional antimony from a source solution. The antimony rich eluent can be disposed of by conventional means, such as previously referred to, or the antimony can be extracted from the eluent and recovered and the eluent recycled.

In carrying out the process it is beneficial if the solid phase is contained in a column and the eluent is allowed to pass through the column by gravity flow. The flow rate may be increased by applying pressure with a pump on the top or bottom of the column or applying a vacuum in the eluent receiving vessel.

The following examples illustrate the use of the elution process of this invention using specific solid separation materials of either the chelating ion exchange resin or ligand bonded to a hydrophilic solid support type to perform antimony separation and also to generate and reuse the solid materials repetitively. In each example the solid separation material is present in a packed bed volume in a column and is washed with a solution of 2M $H_2SO_4$ and then loaded with Sb from solutions, such as Cu electrolyte, until the Sb loading capacity of the solid separation material is reached, i.e. saturation. The remaining loading solution is then washed out using dilute $H_2SO_4$ or $H_2O$. The antimony is then eluted using a combination of $H_2SO_4$ containing a minor amount of HCl. In each test the column was secondarily eluted with 6M HCl to determine if any antimony remained on the column following the primary concentrated sulfuric acid/dilute hydrochloric acid treatment. All Sb analyses were performed using Flame Atomic Absorption Spectroscopy.

EXAMPLE 1

The solid support phase used was a silica gel matrix having bonded thereto a nonmacrocyclic ligand covalently attached to silica gel (available from IBC Advanced Technologies under the tradename SuperLig 92). A ten gram sample was placed in the column, washed with 2M $H_2SO_4$ and loaded with Sb by passing a Cu electrolyte solution containing 6.5 g/l of Sb through the column until it was shown that the column was fully loaded with Sb by the Sb concentration entering the column being the same as the concentration of Sb exiting the column. The column was washed with dilute $H_2SO_4$ to remove any remaining electrolyte solution. The Sb retained in the column was then eluted using a solution of regular or commercial grade 8M $H_2SO_4$ and 0.1M HCl at a flowrate of 10 mls per minute. After 10 minutes, 100 mls of eluent had been collected, including the elution tail. Analysis of the eluent showed that a total of 0.52 g of Sb was collected. The column was then eluted with 6M HCl as a secondary eluant to determine if any Sb remained in the column following the primary elution. However, analysis of the 6M HCl eluant showed no detectable Sb.

EXAMPLE 2

The process of Example 1 was repeated using 8M $H_2SO_4$ in "black acid" form and 0.1M HCl. The bulk solution contained 7.0 g/l of antimony and the elution was completed in 100 mls of eluent. A total of 0.53 grams of antimony was collected in the eluent. No detectable Sb was found in the secondary 6M HCl elution step.

EXAMPLE 3

In this example, a 10 gram chelating ion exchange resin (Rohm & Haas C-467) was used. The bulk solution contained 2 g/l of Sb. The eluant used was 8M of regular $H_2SO_4$ and 0.1M HCl. The elution was carried out at a flowrate of 3 mls/minute and was completed in 350 mls. A total of 0.42 g of Sb was collected. The Sb content in the secondary 5M HCl eluant was 200mg/l. These results indicate that, while Sb elution from the chelating ion exchange resin is not as complete as with the ligand bonded to a solid support, the combination of sulfuric acid and dilute hydrochloric acid is still an effective eluent in removing Sb ions and regenerating the ion exchange resin for reuse.

EXAMPLE 4

The procedure of Example 3 was repeated using "black acid" as the sulfuric acid source. The elution was completed in 375 mls and a total of 0.42 grams of Sb was collected. As in Example 3, the secondary eluant contained an Sb content of 200 mg/l.

EXAMPLE 5

The procedure of Example 4 was repeated using "black acid" with the difference being that the source solution contained 3 g/l of Sb and 0.5M HCl was used as the dilute hydrochloric acid in the primary eluant. All other parameters remained the same. The elution was completed in 250 mls and a total of 0.43 g of antimony was collected. The secondary 6M HCl eluant contained about 100 mg/l of antimony. This shows that by using the dilute HCl in a more concentrated form, a higher recovery is obtained.

EXAMPLE 6

The procedure of Example 2 was repeated with the only difference being that 0.3M HCl was used along with the "black acid" $H_2SO_4$. The Sb recovery was the same, i.e. 0.53 grams Sb and the secondary 6M HCl eluent was found to contain no detectable Sb. This shows the effectiveness of the combined 8M sulfuric acid in 0.3M HCl in removing Sb from the ligand bound to a solid support. However, the 0.1M HCl eluant of Example 2 was just as effective which demonstrates practicality of invention.

EXAMPLE 7

This is similar to Example 3. In this example, a 10 gram chelating ion exchange resin (Rohm & Haas C-467) was used. However, the bulk solution contained 3 g/l of Sb. The eluant used was 8M of regular $H_2SO_4$ and 0.1M HCl. The elution was carried out at a flowrate of 1 mls/minute and was completed in 250 mls. As in Example 3, a total of 0.42 g of Sb was collected. The Sb content in the secondary 5M HCl eluant was 200mg/l.

Although the invention has been described and illustrated by reference to antimony elution from certain chelating ion exchange resins and ligands bonded to hydrophilic solid supports, it is believed the utilization of a combination of concentrated sulfuric acid and dilute hydrochloric acid for antimony elution extends to all solid phase materials utilized to remove antimony from source solutions such as copper refining electrolytes. The invention is limited therefore in scope only by the bounds of the following claims and functional equivalents thereof.

I claim:

1. A method for the removal of antimony ions from solid phases having an affinity for antimony ions which comprises,
   (a) contacting said solid phase having said antimony ions affixed thereto with an aqueous eluent solution comprising a mixture of a concentrated solution of sulfuric acid and a dilute solution of hydrochloric acid thereby quantitatively stripping antimony ions from the solid phase and
   (b) removing said eluent containing said antimony ions from contact with said solid phase.

2. A method according to claim 1 wherein the concentration of the sulfuric acid is 6 to 10M and the concentration of the hydrochloric acid is 0.05 to 0.5M.

3. A method according to claim 2 wherein the solid phase is a member selected from the group consisting of a chelating ion exchange resin and a ligand bonded to a hydrophilic solid support.

4. A method according to claim 3 wherein the solid phase is contained in a column and the eluent is passed through the column.

5. A method according to claim 4 wherein the solid phase is a chelating ion exchange resin.

6. A method according to claim 5 wherein the eluent flowrate through said column does not exceed about 0.1 ml of eluant per gram of resin per minute.

7. A method according to claim 5 wherein the volume of eluant used is between about 15 and 50 mls/gram of resin.

8. A method according to claim 5 wherein the elution is carried out at temperatures of from about ambient to as high as the stability of the resin support.

9. A method according to claim 5 wherein the concentration of the sulfuric acid is about 8M and the concentration of the hydrochloric acid is 0.1 to 0.3M.

10. A method according to claim 5 wherein the sulfuric acid is a "black acid".

11. A method according to claim 4 wherein the solid phase is a ligand bonded to a hydrophilic solid support.

12. A method according to claim 11 wherein the eluent flowrate through said column does not exceed about 1.0 ml of eluant per gram of solid phase per minute.

13. A method according to claim 11 wherein the volume of eluant used is between about 5 and 20 mls/gram of solid phase.

14. A method according to claim 11 wherein the elution is carried out at temperatures of from about ambient to about 100° C.

15. A method according to claim 11 wherein the concentration of the sulfuric acid is about 8M and the concentration of the hydrochloric acid is 0.1 to 0.3M.

16. A method according to claim 11 wherein the sulfuric acid is a "black acid".

* * * * *